T. J. McCONNELL.
COMBINED CLINOMETER AND DIRECTION INDICATOR.
APPLICATION FILED NOV. 23, 1918.
1,371,500.
Patented Mar. 15, 1921.
4 SHEETS—SHEET 1.
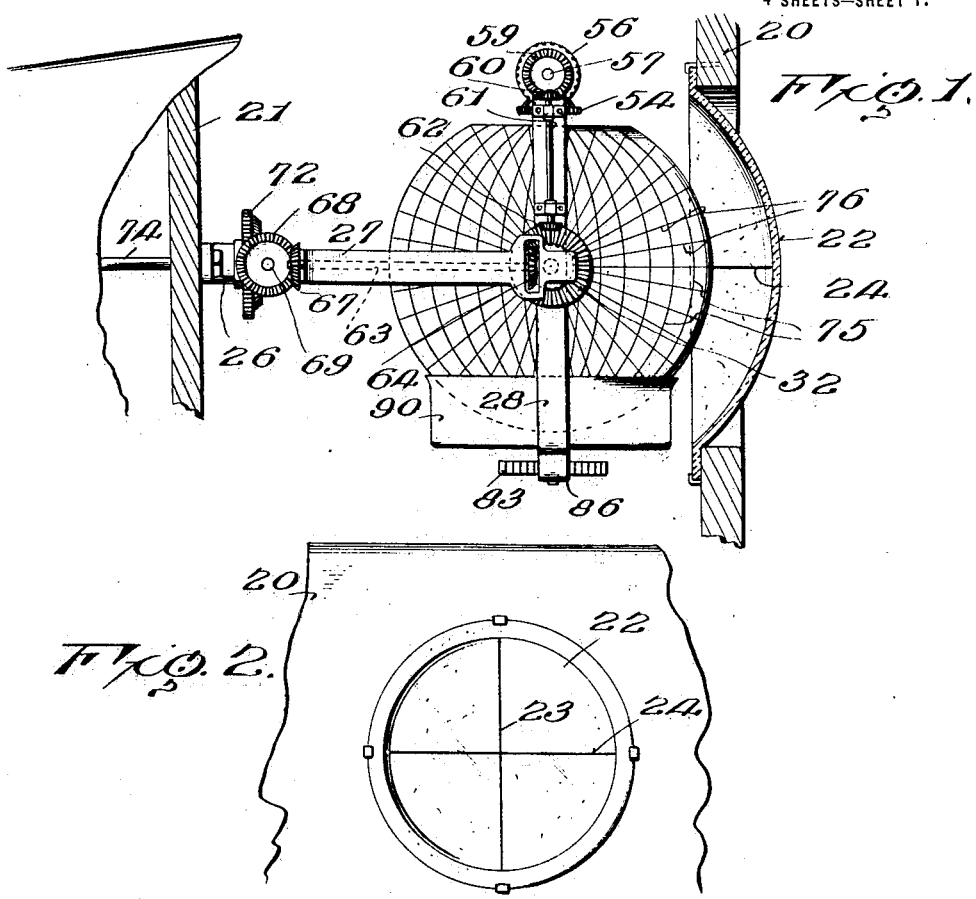
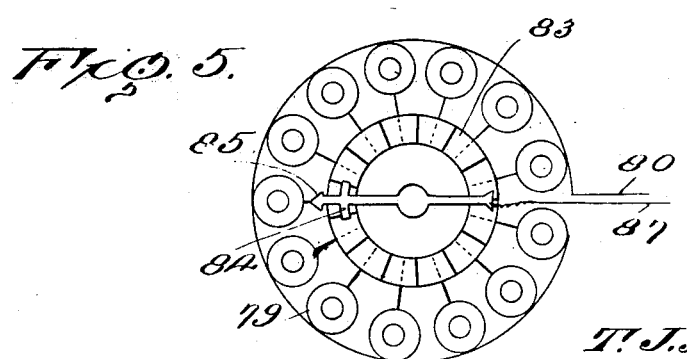
Inventor
T. J. McConnell
By
Attorney T. J. McCONNELL.
COMBINED CLINOMETER AND DIRECTION INDICATOR.
APPLICATION FILED NOV. 23, 1918.

1,371,500.

Patented Mar. 15, 1921.
4 SHEETS—SHEET 2.

Inventor
T. J. McConnell
By Chandler & Chandler
Attorney

T. J. McCONNELL.
COMBINED CLINOMETER AND DIRECTION INDICATOR.
APPLICATION FILED NOV. 23, 1918.
1,371,500.
Patented Mar. 15, 1921.
4 SHEETS—SHEET 3.
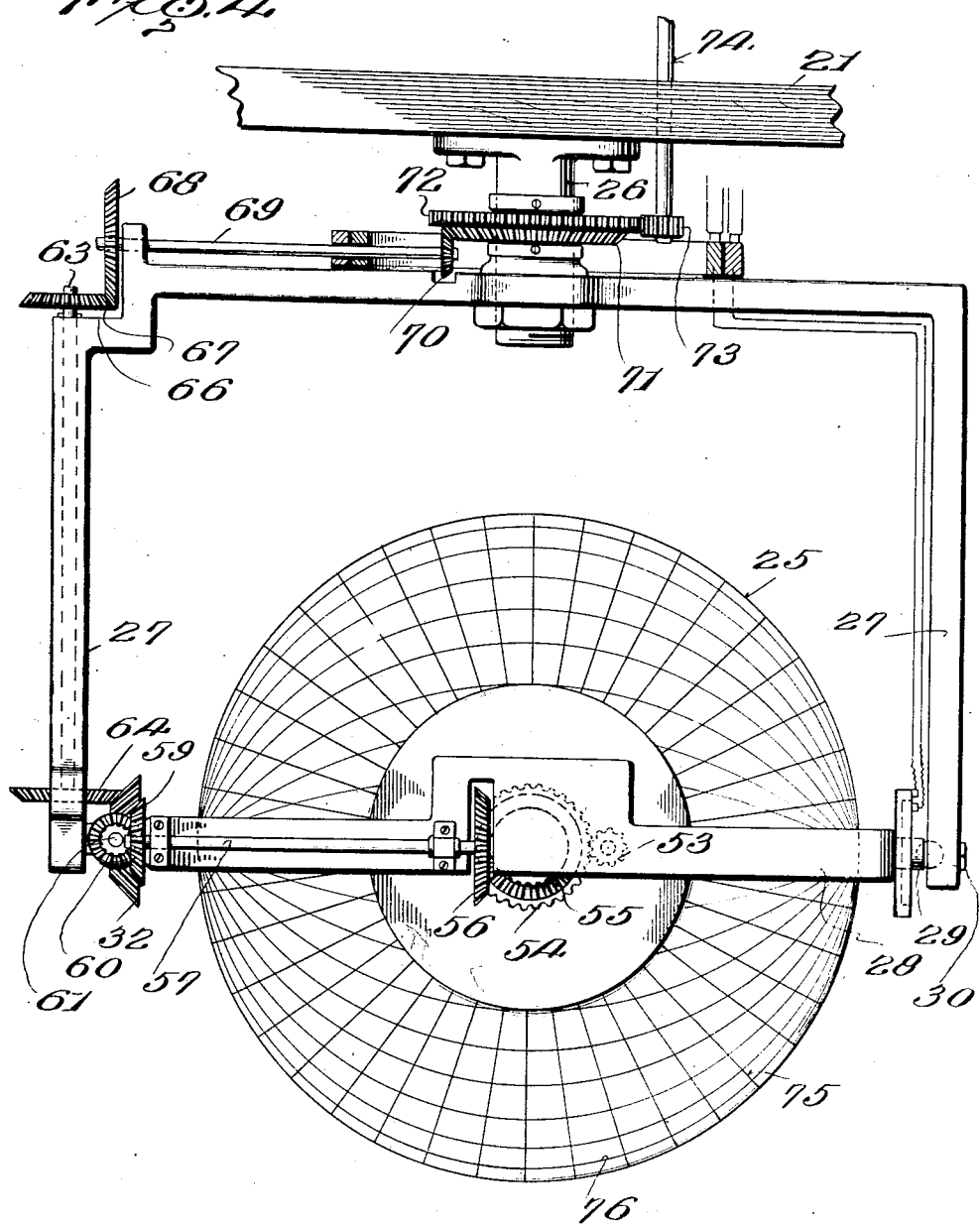
Inventor
T. J. McConnell,
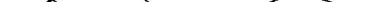
Attorney T. J. McCONNELL.
COMBINED CLINOMETER AND DIRECTION INDICATOR.
APPLICATION FILED NOV. 23, 1918.

1,371,500.

Patented Mar. 15, 1921
4 SHEETS—SHEET 4.

Inventor
T. J. McConnell
By Chandler & Chandler
Attorneys

UNITED STATES PATENT OFFICE.

THOMAS J. McCONNELL, OF ATLANTA, GEORGIA.

COMBINED CLINOMETER AND DIRECTION-INDICATOR.

1,371,500.   Specification of Letters Patent.   Patented Mar. 15, 1921.

Application filed November 23, 1918. Serial No. 263,859.

*To all whom it may concern:*

Be it known that I, THOMAS J. McCONNELL, a citizen of the United States, residing at Atlanta, in the county of Fulton, State of Georgia, have invented certain new and useful Improvements in Combined Clinometers and Direction-Indicators; and I do hereby declare the following to be a full, clear, and exact description of the invention, such as will enable others skilled in the art to which it appertains to make and use the same.

This invention relates to indicators for navigable craft such as aeroplanes and has for its object to provide an improved and highly efficient instrument that will indicate upon a single dial both the longitudinal and the lateral inclination of the aeroplane to the horizontal and also its deviation in direction, from a set course on the compass.

The invention *per se* may have different embodiments, and I am disclosing in the following specification one embodiment in which the dial member is normally held against inclination and deviation through a combination of gyroscopic and electro-magnetic mechanisms and a second embodiment in which gyroscopic mechanisms are employed for both purposes.

In the drawings:—

Figure 1 is a vertical section taken longitudinally through a portion of an air craft to include the instrument board and showing in elevation the mounting of the apparatus with respect thereto.

Fig. 2 is a front elevation of a portion of the instrument board and the sighting glass or crystal therein having its crossed lines.

Fig. 4 is a plan view of the structure shown in Fig. 3.

Fig. 5 is a diagram of the circuits of the electro-magnet control.

Figure 3:
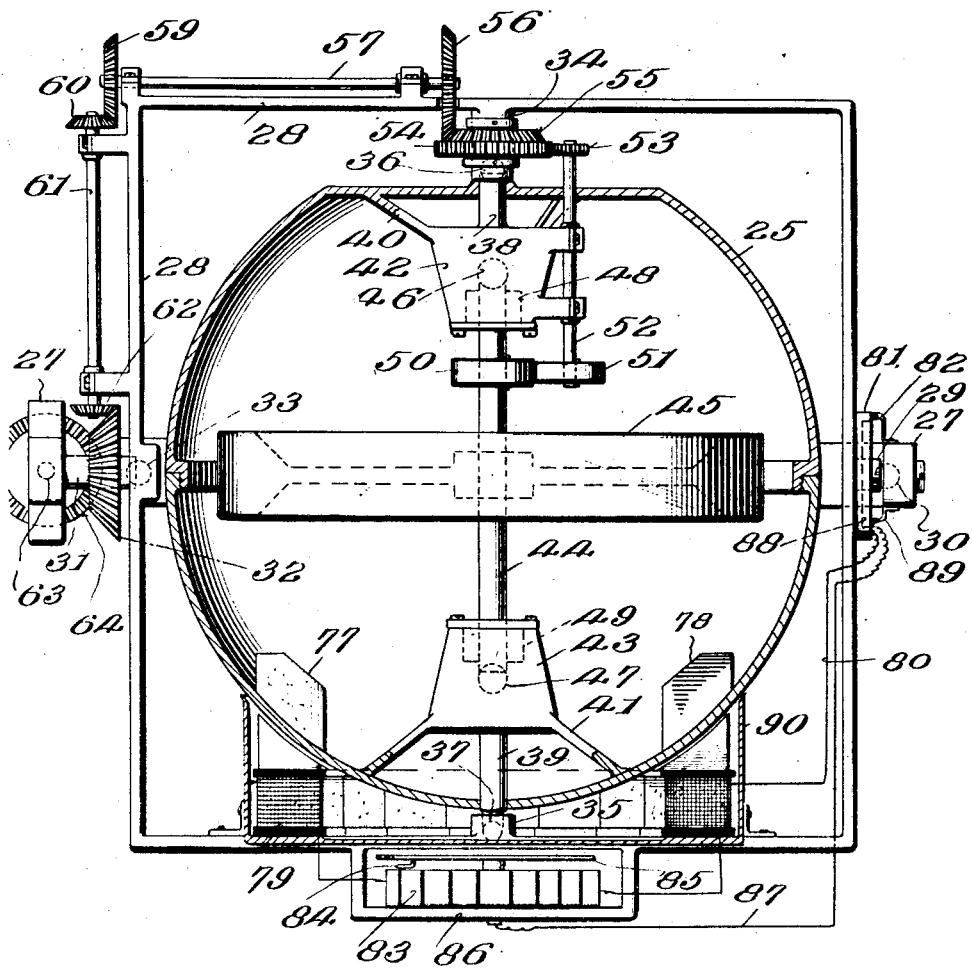
Fig. 3 is a section taken vertically through one embodiment of the apparatus, with parts in elevation.

Referring now to the drawings, there will first be described the embodiment of the invention as illustrated in Fig. 3, it being understood that the mounting of the spherical dial carrier is the same in both cases.

The aeroplane structure is equipped with the usual instrument board 20 in the rear of which is a brace 21 on which the instrument is mounted, the dial of the indicator being visible through a concavo-convex glass or crystal 22 fixed over an opening in the instrument board and which crystal has marked thereon the upright and transverse index lines 23 and 24, at right angles to each other and of which the latter is at right angles to the longitudinal axis of the air craft.

The mounting of the spherical body 25 of the indicator, which latter is hollow and formed separable is by means of gimbal jointed elements, and it includes a stub shaft having a flange at one end through the medium of which it is fixed to the support 21 parallel with the longitudinal axis of the aeroplane. Rotatably mounted upon the stub shaft 26 is a gimbal 27 which is in the form of a fork open at the side opposite to the shaft, and within this gimbal 27 is mounted a second gimbal 28 in the form of a rectangular frame. The latter at one side is provided with a trunnion 29 having a concaved end that receives a bearing ball 30 that lies in a depression in the inner face of the corresponding end of the gimbal 27 to form a pivotal bearing. The gimbal 27 at the other side carries the trunnion, instead of the gimbal 28, and this latter trunnion 31 is elongated to form a bearing for a bevel gear 32 to be presently referred to, said trunnion beyond the bevel gear having its end recessed and loosely entering a recess in the outer face of the gimbal 28 where it receives a bearing ball 33 between it and the bottom of the last named recess.

Extending inwardly from the sides of the gimbal 28 other than those just referred to and at right angles to the upright axis of said gimbal, are the alined studs 34 and 35 which are terminally recessed and receive bearing balls 36 and 37 respectively that engage the terminal recesses of the trunnions 38 and 39 respectively of the spherical body 25 of the indicator. These last named trunnions are alined through the polar axis of the sphere and diametrically of the body into which they extend and on its interior they are provided with suitable braces as illustrated at 40 and 41 respectively and through bearing blocks 42 and 43 supported by the braces.

The blocks 42 and 43 are recessed diametrically of the body 25 to receive the ends of the shaft 44 of a gyroscope wheel 45, the ends of the shaft resting on balls 46 and 47 at the inner ends of the recesses. Roller bearings 48 and 49 in the recesses of the block receive lateral stresses from the shaft 44.

It will be understood that with this construction, if the wheel 45 be of proper weight and be given proper speed of rotation, it will maintain itself with its axis perpendicular to the earth's surface and will tend to maintain the polar axis of the indicator body 25 in set position.

To rotate the wheel 45, its shaft has fixed to it a friction gear 50 that contacts with a friction gear 51 carried by a shaft 52 mounted in bearings on the block 42 and extending through the oblate wall of the body 25 near the axis of said body having the trunnions 38. On the shaft 52 is a pinion 53 meshing with the cylindrical portion of a ring gear 54 rotatably mounted on the stud 34, there being formed integral with the gear 54 a bevel gear 55 that meshes with a bevel gear 56 carried by a shaft 57 mounted in bearings on the corresponding side of the gimbal 28. Shaft 57 beyond the gimbal has a bevel gear 59 that meshes with the gear 60 on a shaft 61 mounted in bearings on an adjacent side of the gimbal and this shaft 61 has a bevel pinion 62 that meshes with the bevel gear 32 hereinbefore referred to. Mounted in the adjacent side of the gimbal 27 is a shaft 63 having at one end a bevel gear 64 operating in an opening through a corresponding enlargement 65 of the gimbal side and also meshing with the gear 32. The corner or angle of this side or arm of the gimbal has a jog 66 into which shaft 63 projects and where it is provided with a bevel gear 67 meshing with a gear 68 on a shaft 69 that is mounted in bearings on the base of the gimbal with which the stub shaft 26 is engaged. The shaft 69 has a bevel gear 70 meshing with a bevel gear 71 rotatably mounted on the shaft 26 to the rear of the gimbal and the base portion of this gear 71 constitutes a cylindrical gear 72 with which meshes a pinion 73 carried by a shaft 74 that is suitably mounted and extended for application of energy thereto.

The spherical body is provided with a superficial dial formed by inscribing two series of circular lines thereon; and, although omitted from the drawings for sake of clearness, certain of these lines of either or both series, or either or both of the lines 23 and 24 on the crystal, or both those on the dial and crystal, may be marked with graduations. The series on the dial include upright lines 75 or meridians of longitude, and transverse lines 76; and the former are useful as explained below for indicating the course or direction of the craft, the latter are useful for indicating pitch, and either or both series of lines are useful for indicating list—hence the instrument is effective both as a direction indicator and a clinometer. In its latter capacity it will be clear that when the longitudinal axis of the aeroplane is horizontal, or in other words, when it is traveling on an "even keel", one of the meridians 75 will lie either directly behind the upright line 23 or substantially in that position, and the central transverse line 76 of the series will lie directly behind the horizontal line 24. As the air craft is tilted to ascend or descend, it will be obvious that said central line will move respectively downward or upward on the crystal and thus indicate pitch, but the meridian line will not alter its position with respect to the upright line 23. As the aeroplane is tilted to one side or the other, the meridian will tilt correspondingly with respect to the upright line on the crystal and also the transverse line will tilt with respect to the horizontal line on said crystal, and therefore both series will indicate list. It will be clear at once, also, that the instrument may thus simultaneously indicate pitch and list.

Within the body 25 and against the lower portion of its wall is fixed a permanent magnet 77, the lines of force of which pass through the material of the body 25. Diametrically opposite to the magnet 77 is a non-magnetic counter-weight 78.

Carried by the gimbal 28 is a ring or series of electro-magnets 79 arranged concentric to the axis of the body 25 and adapted to successively register with the armature 77 when the gimbal 28 is rotated horizontally, as by the turning of the aeroplane in space. One terminal of each of these electro-magnets is connected with a wire 80 leading to a collector ring 81 carried by and insulated from the gimbal 28 concentric to its trunnion 29, and bearing upon this collector ring is a brush 82 carried by and insulated from the gimbal 27 and with which is connected one terminal of a suitable source of electricity, in any desired manner.

The other terminals of the windings of the electro-magnets 79 are connected with the corresponding segments 83 of an annular commutator, which segments are disposed for successive contact by a brush 84 carried by a magnetic needle 85 pivotally mounted above and concentric with the axis of the annular commutator. The commutator and associated parts are supported in a hanger 86 that is suspended from the bottom of the gimbal 28 which is of course held in a vertical plane by gyroscopic action of the wheel 45. A wire 87 leads from the pivot of the magnetic or compass needle 85 to a second collector ring 88 carried by and insulated from the gimbal 28 and concentric with the ring 81, there being a brush 89 touching the ring 88 and carried by and insulated from the gimbal 27 and with which the second terminal of the aforesaid source of electricity is connected in any desired manner. The electro-magnets and the lower portion of the body 25 are inclosed by a brass shell or casing 90 which prevents them from in anywise affecting the action of the needle. It will be understood that with this construction the commutator is so positioned that there will be energized that electro-magnet that will hold the permanent magnet 77 in position with the zero line 75 in a true north and south plane with the vertical axis of the body 25 when in operation. When the aeroplane swings to the right or to the left, the annular series of electro-magnets is moved with it. Now the compass needle, of course, remains stationary and whatever commutator segment is swung into contact with the brush on the compass needle, will effect energization of its electro-magnet 79. Now, the commutator, of course swings with the electro-magnets and before one segment has moved out of contact with the brush, the next segment has moved into contact. While there are two segments in contact, there are two electro-magnets energized and in consequence, the permanent magnet 77 is ranged midway between the energized electro-magnets and correspondingly swings the body 25. As the commutator continues to swing in the same direction, for example to the right, it carries the right hand segment from contact with the brush so that ultimately the brush is only on the one segment. Then, only the one electro-magnet is energized and the permanent magnet 77 is then attracted only by the one electro-magnet and the body 25, of course, correspondingly swings. Thus, is the body caused to rotate with respect to the aeroplane with a step by step movement, and to thus substantially maintain its position with respect to the earth's surface. This is done by moving the prime meridian respectively to the left or to the right of the upright line on the crystal as will now be understood. If meanwhile the craft has no list, the meridian will practically parallel this line, and the transverse line 76 will be parallel with the line 24 unless the craft has some pitch. But the point of intersection between the lines 23 and 24 may be used to read deviation in course, whether or not there is simultaneous list or pitch or perhaps deviation in inclination both laterally and longitudinally of the craft. However wide may be the deviation, the body 25, excepting for a slight oscillatory movement due to the shifting of the magnetic field, will remain stationary. In practice, the brush 84 would contact with one segment before leaving the previously contacted segment and thus the comingling of lines of force of adjacent magnets will effect a gradual actuation of the mechanism.

Figure 6:
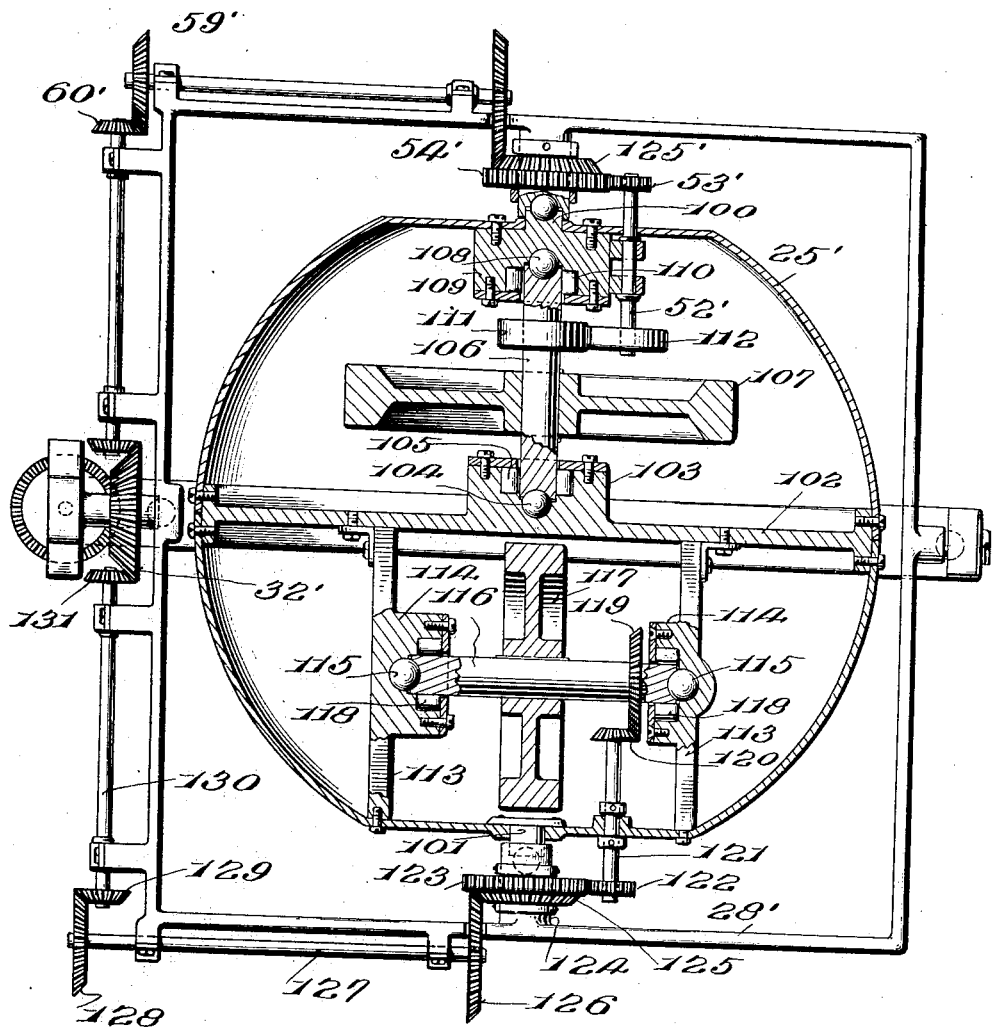
Fig. 6 is a view similar to Fig. 3 showing a modification.

Referring now to Fig. 6 of the drawings, there is shown a second form of the invention in which the body member 25' is again hollow, corresponding to the body 25, and is mounted in the same manner as the body 25. Therefore, to facilitate an understanding of this correlation, the parts exterior to the body 25' that correspond to those exterior to the body 25, are given the same reference numerals primed.

Within the body 25' and at right angles to its alined axial trunnions 100 and 101 is a support 102 having a bearing 103 that alines with the trunnions and in which is disposed a ball 104 and an annular series of rollers 105 that receive the lower end of the shaft 106 of a gyroscope wheel 107. The upper end of the shaft 106 bears against a ball 108 in a bearing block 109 fixed to the inner face of the oblate polar portion of the sphere and lies within an inclosure of an annular series of rollers 110 within the block. The shaft 106 has a friction gear 111 that contacts with a gear 112 on a shaft 52' that corresponds to the shaft 52 in the structure previously described and through the medium of which the wheel 107 is rotated as in the other structure. The shaft 52' is mounted in suitable bearings carried by the block 109.

Mounted between the support 102 and what in operation is the lower oblate portion of the sphere 25', are the supports 113 having bearing blocks 114 in which are disposed balls 115 that take into the recessed ends of the shaft 116 of a gyroscope wheel 117, the shaft being encircled by roller bearings 118. These bearings may of course be of any particular kind and mounted in any desired manner. Upon the shaft 116 is a bevel gear 119 with which meshes a bevel gear 120 on a suitably journaled shaft 121 that extends exteriorly of the body 25' where it is provided with a pinion 122 meshing with the gear 123 mounted upon a stub shaft 124 that projects from the corresponding side of the gimbal 28'. The gear 123 has a beveled portion 125 with which engages a bevel gear 126 carried by a shaft 127 mounted upon the gimbal 28' and having at its opposite end a bevel gear 128 that meshes with a similar gear 129 carried by a shaft 130 that has at its opposite end a bevel gear 131 that meshes with the bevel gear 32' that corresponds to the bevel gear 32 of the previously described structure, that is mounted and operated in the same manner.

With this last described structure, it will be understood that while the gyroscopic wheel 107 maintains the spherical body 25' against axial rotation in every vertical plane, the wheel 117 prevents axial rotation of the body in a horizontal plane. The body is thus held against axial movement in all directions with the aeroplane, as permitted by its gimbal mounting, and it is provided with a dial the same as that previously described. In connection with the dial are index lines the same as those previously explained, which indicate inclinations and deviations as hereinbefore stated. It will be noted that while the bevel gear 59' is at the inner side of the bevel gear 60', the bevel gear 128 is at the outer side of the gear 129. The object is to provide against pressure on pinions 53' and 122 in the same direction by the gears 54' and 125' respectively, such as would tend to rotate the body 25' on its vertical axis.

What is claimed is:

1. In an instrument for navigable craft, the combination with a spherical body having thereon a dial including circular lines around its surface, a mounting connecting the poles of said body with the craft, and means for holding such body with its polar axis in fixed relation to the horizon; of means for turning said body on its axis to correspond with deflections in the course of the craft, and an index coacting with said lines to indicate both the inclination and the direction of said craft.

2. In an instrument for navigable craft, the combination with a sphere marked with meridian lines, gimbal joints connecting its poles with the craft, and means for holding its polar axis plumb; of means for turning said sphere on its axis to correspond with deflections in the course of the craft, and an index coacting with said lines to indicate both the inclination and the direction of said craft.

3. In an instrument for navigable craft, the combination with a sphere marked with meridian lines, a mounting connecting its poles with the craft by which it is carried, and means for holding its polar axis plumb; of means for turning said sphere on its axis to correspond with deflections in the course of the craft, and an index having an upright line coacting with said meridian lines to indicate both the list and the direction of the craft.

4. In an instrument for navigable craft, the combination with a sphere marked with transverse lines and with meridian lines, a jointed mounting supporting it on the craft, and means for holding the sphere with its axis plumb; of means for turning the sphere to correspond with deflections in the course of the craft, and an index fixedly carried by the craft and having upright and transverse lines coacting with the lines on the sphere to indicate the list, pitch, and direction of the craft.

5. In an instrument for navigable craft, the combination with a hollow sphere marked with transverse lines and with lines of longitude, a jointed mounting supporting it on a craft, and means within the sphere for holding it with its polar axis plumb; of means for turning the sphere to correspond with deflections in the course of the craft, and an index on the craft adjacent the shell of the sphere having a fixed point coacting with said lines to indicate list, pitch, and direction.

6. In an instrument for air craft, the combination with a hollow sphere marked with upright and transverse lines, a jointed mounting supporting it on the craft, a weight within the sphere for holding it with its polar axis upright, and means within said sphere tending to retain it in set position; of means for turning the sphere on its axis to correspond with deflections in the course of the craft, and an index fixed on the craft adjacent the shell of the sphere and with which index said lines coact to indicate list, pitch, and direction.

7. In an instrument for navigable craft, the combination with a hollow body in the form of an oblate spheroid and having a dial on its surface, gimbal-jointed frames connecting its polar axes with the craft, and an index on the craft coacting with said dial; of a gyroscope mounted within the body, and driving means therefor leading from the gyroscope out the oblate wall of the body alongside its axial line, and along the sides of said frames to a source of power.

8. In an instrument for navigable craft, the combination with a hollow body in the form of an oblate spheroid and having a dial on its surface, gimbal-jointed frames connecting its polar axes with the craft, and an index on the craft coacting with said dial; of a gyroscope mounted within the body and having a friction gear on its shaft, a shaft journaled through the oblate portion of the body-shell and having a friction gear engaging that on the gyroscope and a pinion on its outer end, a ring gear mounted loosely on one of said axes and in mesh with said pinion, and a train of shafts and gears leading from the ring gear along the sides of said gimbal frames to a source of power carried by said craft.

9. In an instrument for navigable craft, the combination with a globe marked with upright and transverse lines, a jointed mounting for supporting it on the craft, and means for holding the globe with its axis plumb; of a concavo-convex crystal fixedly carried by the craft adjacent the globe and having upright and transverse lines coacting with the lines on the globe, for the purpose set forth.

10. In an instrument for navigable craft, the combination with a spherical body having meridian lines on its surface, a mounting connecting its poles with the craft by which it is carried, and means for holding such body with its polar axis in set position; of means for turning said body on its axis, a pivoted magnetic needle, mechanism whereby its movements actuate said means to correspond with deflections in the course of the craft, and an index coacting with said lines to indicate the direction of said craft.

11. In an indicator for navigable craft, the combination with a sphere marked with lines, gimbal joints connecting its poles with the craft by which it is carried, and means for holding its polar axis plumb; of means for turning said sphere on its axis, a pivoted magnetic needle, mechanism whereby its movements actuate said means to correspond with deflections in the course of the craft, and an index coacting with said lines to indicate the direction of said craft.

12. In a direction indicator for craft, the combination with a round body whose axis is rotatable in a support on the craft, the body having lines radiating from such axis, and an index on the craft coacting with said lines; of an armature and a ring of electro-magnets carried by the body and the support, a pivoted magnetic needle, and mechanism whereby its variations control the energization of the several magnets to rotate said body, as set forth.

13. In an instrument for indicating the direction of air craft, the combination with a round hollow body having marks on its exterior, means whereby it is supported for rotation on an upright axis, and an index coacting with said marks; of a ring of electro-magnets carried by said craft, an armature on said body and movable past the magnets, an annular commutator whose segments are electrically connected respectively with said magnets, a pivoted magnetic needle electrically connected with a source of energy, and a brush on the needle moved over said segments by the variations of the needle as it moves under polar attraction, as set forth.

In testimony whereof I affix my signature in the presence of two witnesses.

THOMAS J. McCONNELL.

Witnesses:
 L. RICHARDSON,
 R. J. MORRIS.